United States Patent [19]

Tornay

[11] Patent Number: 5,240,026

[45] Date of Patent: Aug. 31, 1993

[54] SYSTEM FOR CONTROL OF OIL LEAKAGE FROM DAMAGED TANKER

[75] Inventor: Edmund G. Tornay, New York, N.Y.

[73] Assignee: Energy Transportation Group, Inc., New York, N.Y.

[21] Appl. No.: 826,443

[22] Filed: Jan. 27, 1992

[51] Int. Cl.[5] ............................................. F16L 37/08
[52] U.S. Cl. ................................. 137/68.1; 114/74 R
[58] Field of Search ............... 137/68.1, 67; 251/147; 114/74 R

[56] References Cited

U.S. PATENT DOCUMENTS 4,519,411  5/1985  Tohahashi ........................... 137/68.1
4,964,437  10/1990  Tomay ................................. 137/1

Primary Examiner—John C. Fox
Attorney, Agent, or Firm—Brumbaugh, Graves, Donohue & Raymond

[57] ABSTRACT

Outflow of oil from a damaged tanker having some tanks dedicated for carriage of oil and others for sea water ballast is minimized by transferring oil out of the upper part of any damaged tank to one or more empty ballast tanks. This is accomplished by installing a passageway in bulkheads common to a cargo tank and a ballast tank which is normally closed by a one-shot valve including an annular flange secured to one end of a section of pipe, a blank flange secured to said one end of said pipe by a short, thin, cylindrical sealing ring and a hydraulic hose compressed between the flanges which, when pressurized, ruptures the sealing ring to release the blank flange and open the passageway to allow oil to flow from the damaged cargo tank to a ballast tank.

7 Claims, 3 Drawing Sheets

SYSTEM FOR CONTROL OF OIL LEAKAGE FROM DAMAGED TANKER

BACKGROUND OF THE INVENTION

This invention relates generally to tankers for carriage of liquids such as oil and, more particularly, to a system for control of oil leakage from a damaged tanker. In a more specific sense, the invention relates to improvements to the oil leakage control system described in applicant's U.S. Pat. No. 4,964,437 dated Oct. 23, 1990 and copending U.S. patent application Ser. No. 07/728,200, filed Jul. 10, 1991.

Briefly, the system described in the patent minimizes the outflow of oil from a damaged cargo tank of an oil tanker of the "segregated ballast" type by transferring oil out of the upper part of the damaged cargo tank and at the same time, keeping to a minimum the reduction of draft at the damaged area. This is accomplished by valves and piping installed through selected bulkheads for connecting each cargo tank to one or more ballast tanks, one or more of the valves being opened upon occurrence of damage sufficient to cause cargo tank leakage, allowing oil to flow, by gravity, from the upper part of the damaged cargo tank or tanks to one or more ballast tanks which, if the tanker were loaded, would be empty. Each connection between a cargo tank and a ballast tank includes two valves, either butterfly or sluice valves, connected in tandem, to prevent oil contamination of ballast as any occur from valve leakage in normal operation. The valves typically have a diameter in the range from three to five feet, the choice being a trade-off between the cost of the valves and the rate at which it is desired to transfer oil from the damaged cargo tank to the ballast tank(s), and each is equipped with an actuator for opening and closing the valve. Considering that a typical tanker may require at least ten such pairs of valves to effectively control oil leakage by this method, the installation obviously is expensive.

A less expensive and more effective valve structure for use in the system described in applicant's copending application Ser. No. 07/728,200 filed Jul. 10, 1991, comprises a section of pipe installed in a bulkhead common to a cargo tank and a ballast tank which is normally closed at the ballast tank end by a one-shot valve including a blank flange bolted to an annular flange secured to the end of the pipe and a high pressure hydraulic hose compressed between the flanges and operative when pressurized to break the bolts and thereby release the flange. Upon occurrence of damage sufficient to cause cargo tank leakage, an instrumentation and control system applies hydraulic pressure to appropriate hydraulic hoses, thereby to open one or more passageways to allow oil to flow, by gravity, from the upper part of the damaged cargo tank or tanks to one or more ballast tanks.

Although this one-shot valve operates satisfactorily, it is relatively expensive to fabricate and install because of the need to drill a large number of bolt holes through two steel flanges, each of which may be three-fourths to one inch thick.

It is the primary object of the present invention to provide an improved one-shot valve adapted to be fitted in a bulkhead of a tanker and adapted to be opened in response to applied hydraulic pressure.

Another object of the invention is to provide a one-shot valve for initiating oil flow from a damaged cargo tank to a ballast tank which is more effective for the purpose, and less expensive, than the one-shot valve described in the forementioned copending application.

SUMMARY OF THE INVENTION

The one-shot valve according to the present invention, as in the systems described in the aforementioned commonly assigned patent and application, is installed in each bulkhead common to a cargo tank and a ballast tank, at a predetermined height above the bottom of a tanker, and when opened allows oil to flow from a damaged cargo tank to an empty ballast tank. This fluid control arrangement includes a section of pipe defining a passageway for oil which is normally closed at the end extending into a ballast tank with a positive sealing one-shot valve including an annular flange secured to the end of the pipe, a short, thin, cylindrical sealing ring welded to the end of the pipe and to a blank flange, and a high pressure hydraulic hose compressed between the flanges and operative when pressurized to rupture the sealing ring and thereby release the blank flange and open the passageway. Upon occurrence of damage sufficient to cause cargo tank leakage, an instrumentation and control system applies hydraulic pressure to appropriate hydraulic hoses, thereby to open one or more passageways to allow oil to flow, by gravity, to one or more ballast tanks.

Other objects, features and advantages of the invention will become apparent, and its construction and operation better understood, from the following detailed description read in conjunction with the accompanying drawings.

DESCRIPTION OF THE PREFERRED EMBODIMENT

Figure 1:
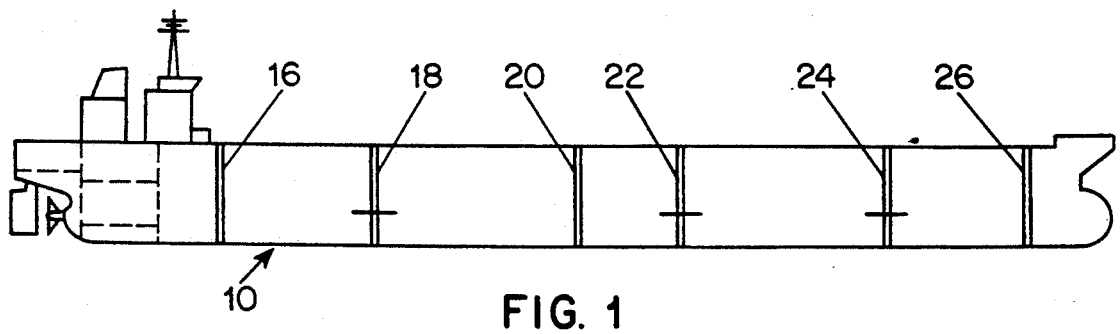
FIG. 1 is a diagrammatic elevation cross-sectional view of a oil tanker of the segregated ballast type.
Figure 2:
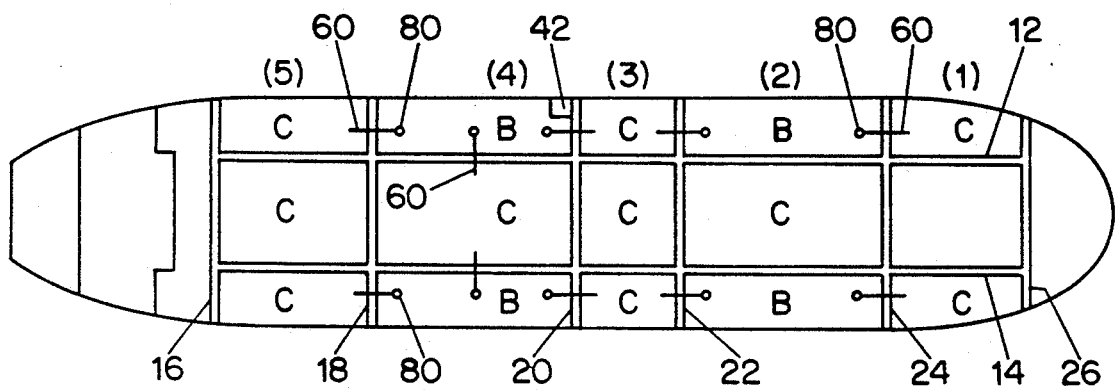
FIG. 2 is a diagrammatic plan view of the tanker.

FIGS. 1 and 2 diagrammatically illustrate an oil tanker 10 of the "segregated ballast" type which is sub-divided by longitudinal bulkheads 12, 14 and transverse bulkheads 16, 18, 20, 22, 24, 26 to form a plurality of tanks, numbered (1) to (5) from bow to stern in FIG. 2, some of which are dedicated for carriage of cargo oil and others of which are dedicated for carriage of sea water ballast, designated "C" and "B", respectively. The longitudinal bulkheads 12 and 14 together with portions of the transverse bulkheads define five center cargo tanks, and with the hull and other portions of the transverse bulkheads define two sets of wing tanks alternately dedicated for cargo and ballast. While it is the intention of international regulations that the ballast tanks be used only for sea water ballast, for the practice of the present invention they are used as emergency receptacles for cargo oil in the event of damage to one or more cargo tanks, such use being justified o the ground that containment is preferable to outflow of oil, and the ballast tanks can, in any case, be cleaned.

When the tanker is loaded, the cargo tanks "C" are filled almost to the top and the ballast tanks "B" are all empty or nearly empty. In order to minimize oil outflow in the event one or more cargo tanks is ruptured by grounding or collision, valves and associated piping are fitted in the bulkheads to provide passageways, when the valves are open, from each cargo tank to one or more ballast tanks. As shown in FIG. 2, valves 80 secured to the ballast tank end of a connecting pipe 60 ar installed in selected bulkheads shared by a cargo tank and a ballast tank, the selection of ballast tanks to be connected to each cargo tank depending on the number and arrangement of the tanks on the ship. Each connection is installed at a vertical height above the bottom of the tanker corresponding approximately to the tankers's beam divided by fifteen, the elevation stipulated by the rules of the International Maritime Organization governing the design of tank vessels as the assumed vertical penetration in case of bottom damage. Equipment located above B/15 can be assumed to escape damage in a grounding incident.

Figure 3:
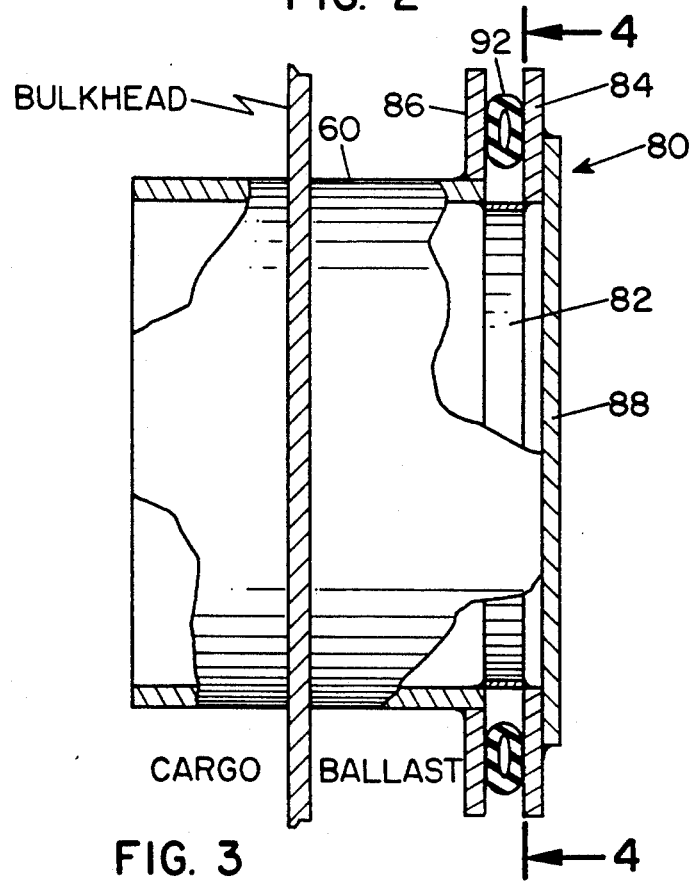
FIG. 3 is a side view, partially cut away and partially in section, of a valve structure according to the invention.

The valve according to the present invention, shown in FIG. 3, comprises a short section 60 of pipe which is welded or otherwise secured in sealing relationship in an opening in a bulkhead which is common to a cargo tank and a ballast tank. The end of pipe section 60 which extends into a ballast tank is normally closed with a positive sealing one-shot valve 80 which comprises an annular-shaped flange 86 having an inner diameter which corresponds to the outer diameter of pipe 60 and is welded to the pipe section at or closely near the end. A thin sealing member 82, a short steel ring having a thickness on the order of 0.025 inch, a length on the order of 1.0 to 1½ inches, depending on the diameter of the hydraulic hose to be used, and an outside diameter about the same as the inside diameter of pipe 60, is welded at one end to pipe 60 and at the other end is welded to a second annular-shaped flange 84. During fabrication, sealing ring 82 is first welded to pipe section 60, flange 84 is then welded to the other end of sealing ring 82, and after the inside surface of the welded seal is thoroughly coated to prevent corrosion, a blank flange 88 is welded to the outer surface of flange 84 to sealingly close the passageway. Assembly in this order provides welding access, from the ballast tank, to the sealing ring 82. The dimensions of ring 82, which may have a diameter of four or five feet, are such that the stress in the ring caused by the weight of flanges 84 and 88, which may be as much as 1000 pounds, is very low so the ring shows no tendency to buckle or shear. Typically, the pipe 60 may be 48 inches in diameter, and the flanges 84, 86 and 88 may be one-inch steel plate.

Figure 4:
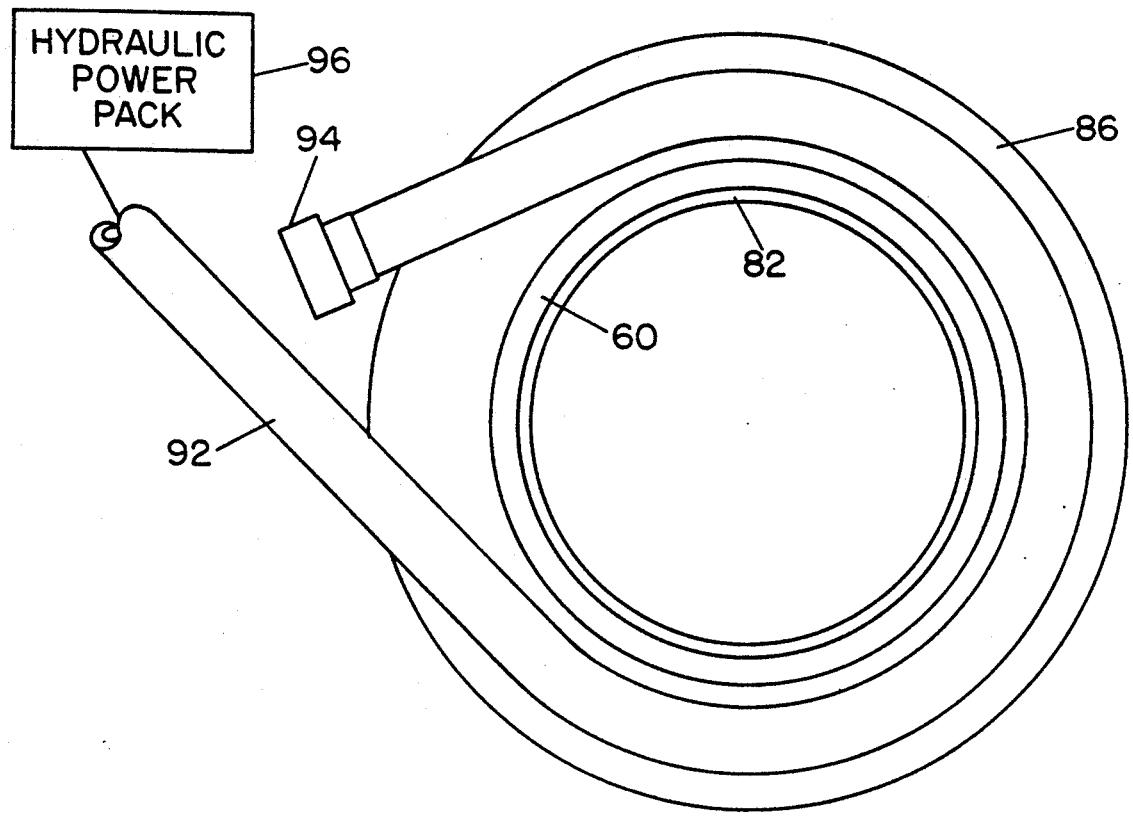
FIG. 4 is an elevation cross-sectional view taken along line 4—4 of FIG. 3.
Figure 5:
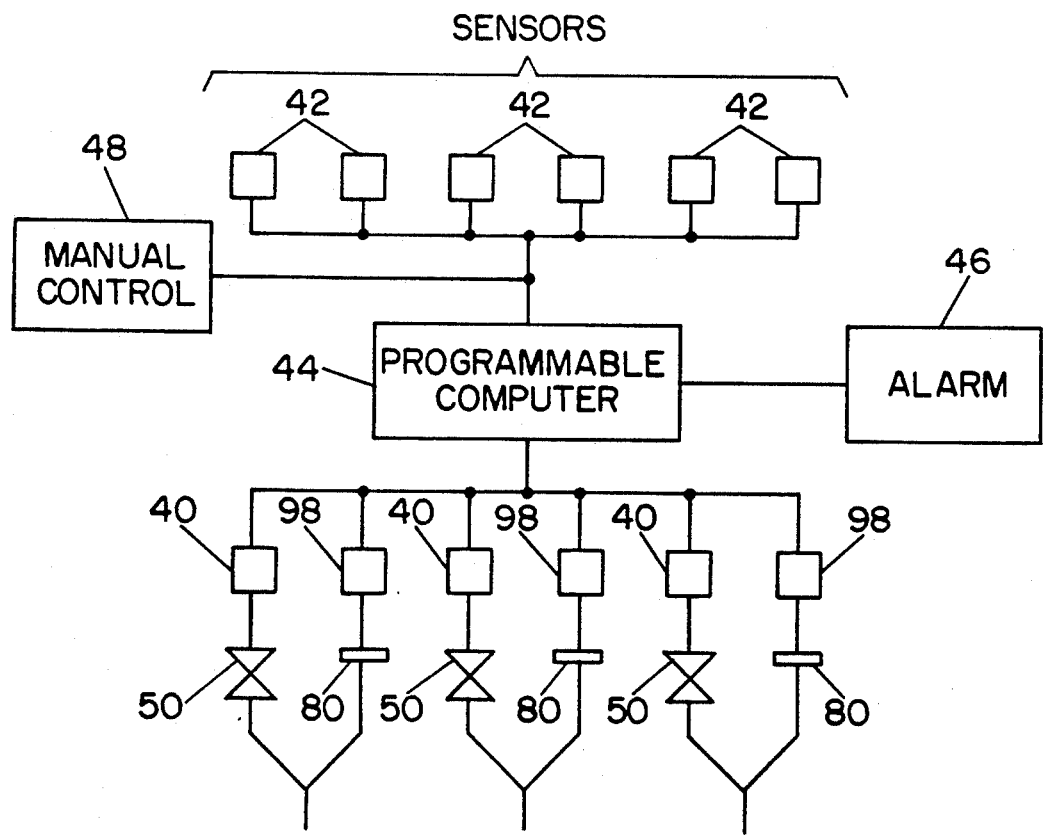
FIG. 5 is a schematic block diagram showing instrumentation and control apparatus for the system according to the invention.

The valve 80 is opened by rupturing the welded seal 82 so as to release the flange 84 and with it flange 88, this being accomplished by pressurizing a reinforced rubber hose 92 compressed between flanges 84 and 86, as seen in FIG. 3. As shown in FIG. 4, in which flanges 84 and 88 are removed, the hose is arranged in a circle outwardly from the periphery of the sealing ring 82 and projects outwardly at about the same point so as to form essentially a closed circle. The hose 92 is closed at one end by a suitable pressure cap 94, and its other end is connected via suitable hoses and fittings (not shown) to a source of hydraulic power 96 capable of pressurizing the hose to a predetermined pressure in the event it should become necessary to open the passageway. The source 96 may be a hydraulic power pack of known construction, consisting essentially of a hydraulic pump and an electric motor, which is commercially available from several manufacturers, including Vickers Hydraulics, York Industries and Dayton. Typically, the hose 92 has an inside diameter of about one inch and is designed to withstand a pressure of at least 3000 psi. As shown in the diagram of FIG. 5, each hydraulic power pack 96 is equipped with an actuator 98 which is operative responsively to an applied control signal to quickly generate and apply to its associated high pressure hose hydraulic pressure sufficient to fracture the thin welded seal 82, whereupon the blank flange 88 is released. The blank flange, which could weigh more than half a ton, preferably is supported by a slack steel cable (not shown) to avoid the possibility of damage to the ship's bottom and sparking. In a one-shot valve constructed as described, the welded seal ripped all around when a pressure in the range from about 1500 psi to about 3000 psi is sustained for less than a minute. The abrupt drop in pressure within the hose that occurs when the seal is fractured may be used to turn off the hydraulic power pack.

A level sensor 42 installed in each cargo tank, one of which is shown in FIG. 2 and six of which are shown in the schematic diagram of FIG. 5, detects a drop in oil level as would be caused by outflow of oil therefrom and in response generates and applies an output signal to a programmable computer 44. Upon receipt of a signal from one or more sensor, the computer sounds an alarm 46 and applies a control signal to each of the hydraulic power pack actuators 98 appropriate to open the passageways that will minimize oil outflow. The computer is preprogrammed to open the passageways appropriate for redistributing the cargo to minimize overboard leakage and at the same time control trim, heel and stability of the vessel within safe limits. The instrumentation preferably includes an override control 48 and display panel (not shown) mounted on the bridge of the tanker for enabling manual operation of selected valves 80 should conditions require.

In operation, in the event a loaded tanker sustains damage that allows oil to flow out of the hull, the sensor 42 in the affected cargo tank or tanks transmits an output signal to the computer 44 which, in turn, causes appropriate one-shot valves to be opened to allow oil to flow from the upper part of the damaged cargo tank or tanks to a selected ballast tank or tanks, which would be empty. Although some oil will continue to go overboard, the amount will be reduced by the substantial flow of oil to the ballast tank(s), the volume of which and, accordingly, the time required to drop the oil level in the damaged tank to just above the water level, are predictable. By containing the oil which would otherwise be discharged overboard the weight of the vessel is not significantly reduced; because the outflow is reduced the tanker does not rise much out of the water and the draft at the area of damage is substantially maintained which, in itself, contributes to a decrease in oil outflow. The relative amounts lost overboard and transferred to ballast tank(s) depend on the relative sizes of the valved passageway and the rupture in the cargo tanks or tanks. The velocity of oil flow through the passageway to the ballast tanks will be much higher than the flow overboard because the pressure head is the height of the cargo above the passageway, whereas the driving head of the overboard leakage is the height of the cargo above the water line. No pumps are required, the transfer of oil from cargo tank to ballast tank being accomplished entirely by gravity, with assistance from the phenomenon that oil flow out of the hull ceases when the oil level in a ruptured tank drops to just above the water level.

Figure 6:
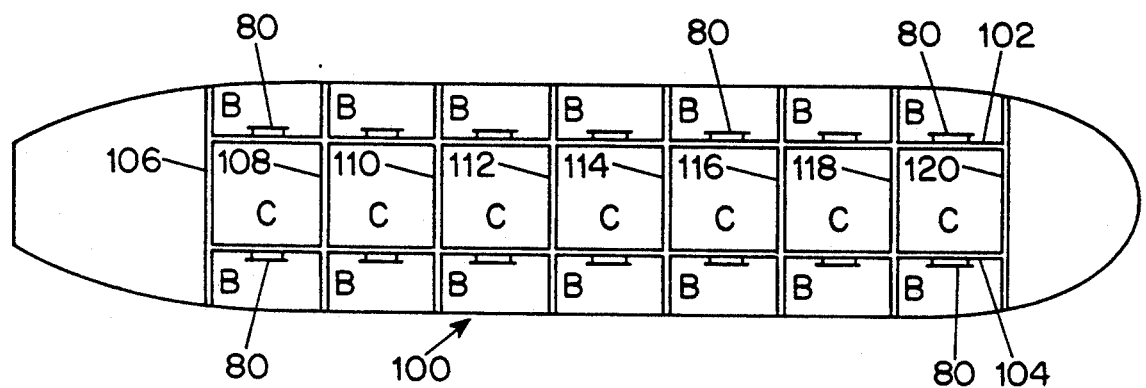
FIG. 6 is a diagrammatic plan view of a tanker of the double-sided type illustrating another application of the positive sealing one-shot valve of the invention.

The described system for controlling overboard oil leakage is also applicable to the tanker design depicted in FIG. 6 intended for new construction. The hull 100 has a single bottom and typically is sub-divided by longitudinal bulkheads 102 and 104 and transverse bulkheads 106, 108, 110, 112, 114, 116, 118, and 120 to form seven cargo tanks "C" distributed along the center each having associated therewith a pair of collision-protection side tanks dedicated for carriage of sea water ballast. In terms of pollution protection, this design is comparable to the double hull and Mitsubishi mid-deck design, yet costs little more than a single hull tanker. In a tanker of this design the passageway from cargo tank to ballast tank is closed with one or more one-shot valves 80 installed in each bulkhead shared by a cargo tank and a ballast tank and, because their size is limited only by the size of available pipe, may be made quite large, up to five feet or more in diameter, whereby to shorten the time required to drop the oil level in a damaged tank to just above the water level.

While a preferred embodiment of the invention has been described, it will be evident that various changes and modifications may be effected without departing from the spirit and scope of the inventive concepts. It is to be understood that the invention is not limited to the illustrated embodiment, the intention being to cover by the appended claims all such modifications as fall within their scope.

I claim:

1. Apparatus for minimizing outflow of oil from a rupture in a cargo tanker of the type that is sub-divided by longitudinal and transverse vertically-oriented bulkheads arranged to form a plurality of tanks, some dedicated for carriage of oil and others dedicated for carriage of water ballast and empty when the tanker is loaded with oil, said apparatus comprising, in combination:

means fitted in bulkheads common to a cargo tank and a ballast tank, at a predetermined height above the bottom of the tanker, including a section of pipe extending through an opening in the bulkhead and defining a passageway for transferring oil from the cargo tank to the ballast tank and means for normally closing said passageway, said means for closing comprising one-shot valve means in sealing relationship with the end of said pipe section that extends into the ballast tank comprising an annular flange secured to said pipe section, a thin, cylindrical sealing ring one end of which is welded to the end of said pipe section, a blank circular flange secured to a second end of said sealing ring and a high pressure hydraulic hose compressed between said annular flange and said blank flange and operative when pressurized to rupture said sealing ring and thereby release said blank flange;

sensing means disposed in each cargo tank for detecting the occurrence of a rupture therein sufficient to cause outflow of oil and responsively thereto producing an output signal; and control means responsive to said output signal including means pressurizing said hydraulic hose to a pressure sufficient to rupture said sealing ring, whereby to open said passageway for oil to flow by gravity from a cargo tank to an empty ballast tank.

2. Apparatus according to claim 1, wherein said control means includes programmable computer means responsive to output signals from said sensing means for opening those passageways appropriate for redistributing the oil cargo of the tanker to minimize outflow of oil and at the same time controlling within safe limits the trim, heel and stability of the tanker.

3. A fluid control arrangement adapted to be fitted in an opening in a bulkhead common to a liquid cargo tank and a ballast tank, comprising:

a section of pipe extending through and sealingly secured in an opening in a bulkhead and defining a passageway for fluid to flow from a cargo tank to a ballast tank; and one-shot valve means in sealing relationship with a first end of said pipe section, said valve means comprising an annular flange secured to said first end of said pipe section, a thin, cylindrical sealing ring welded at one end to said first end of said pipe section, a blank circular flange welded to a second end of said ring, and a high pressure hydraulic hose arranged substantially in a circle and compressed between said annular flange and said circular blank flange, said hydraulic hose when pressurized being operative to rupture said sealing ring and thereby release said blank circular flange for opening said passageway.

4. A fluid control arrangement according to claim 3, wherein said hydraulic hose is closed at one end, and wherein means for pressurizing said hydraulic hose to a pressure sufficient to rupture said sealing ring is connected to the other end of said hose.

5. A fluid control arrangement according to claim 4, wherein said means for pressurizing said hydraulic hose comprise a hydraulic power pack for generating hydraulic pressure.

6. A fluid control arrangement according to claim 3, wherein said circular blank flange comprises an annular-shaped flange having substantially the same dimensions as said annular flange and is welded to said second end of said sealing ring, and a circular blank flange welded to said annular-shaped flange.

7. A fluid control arrangement according to claim 3, wherein the thickness of said cylindrical sealing ring is about 0.025 inch.

* * * * *